(12) United States Patent
Jayasekara

(10) Patent No.: US 7,446,979 B2
(45) Date of Patent: Nov. 4, 2008

(54) LAMINATED DRAPED SHIELD FOR CPP READ SENSORS

(75) Inventor: Wipul Pemsiri Jayasekara, Los Gatos, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 516 days.

(21) Appl. No.: 10/955,701

(22) Filed: Sep. 30, 2004

(65) Prior Publication Data

US 2006/0067005 A1    Mar. 30, 2006

(51) Int. Cl.
*G11B 5/39* (2006.01)

(52) U.S. Cl. .................................... 360/319

(58) Field of Classification Search ............... 360/319, 360/125, 126, 317, 324.2; 257/643; 438/551
See application file for complete search history.

(56) References Cited

U.S. PATENT DOCUMENTS

| | | | |
|---|---|---|---|
| 5,838,521 A | 11/1998 | Ravipati | 360/113 |
| 6,219,212 B1 | 4/2001 | Gill et al. | 360/324.2 |
| 6,292,334 B1 | 9/2001 | Koike et al. | 360/319 |
| 6,456,467 B1 | 9/2002 | Mao et al. | 360/319 |
| 6,496,335 B2 | 12/2002 | Gill | 360/319 |
| 6,614,629 B1 | 9/2003 | Kakihara | 360/324.1 |
| 6,680,832 B2 | 1/2004 | Fontana, Jr. et al. | 360/324.2 |
| 6,710,987 B2 | 3/2004 | Sun et al. | 360/324.2 |
| 6,731,474 B2 | 5/2004 | Terunuma et al. | 360/319 |
| 6,735,058 B2 | 5/2004 | Lin et al. | 360/319 |
| 2002/0030947 A1* | 3/2002 | Chen et al. | 360/319 |
| 2002/0097534 A1 | 7/2002 | Sun et al. | 360/324.2 |
| 2002/0131215 A1 | 9/2002 | Beach | 360/324.2 |
| 2002/0167768 A1* | 11/2002 | Fontana et al. | 360/324.2 |
| 2003/0002227 A1* | 1/2003 | Jarratt | 360/319 |
| 2003/0214763 A1* | 11/2003 | Childress et al. | 360/324.2 |
| 2004/0047085 A1 | 3/2004 | Liao et al. | 360/324.12 |
| 2004/0090716 A1 | 5/2004 | Jayasekara | 360/324.2 |
| 2006/0098334 A1* | 5/2006 | Jayasekara et al. | 360/125 |
| 2006/0231930 A1* | 10/2006 | Araki et al. | 257/643 |
| 2006/0234483 A1* | 10/2006 | Araki et al. | 438/551 |

FOREIGN PATENT DOCUMENTS

JP         2002025018 A       1/2002

* cited by examiner

*Primary Examiner*—Tianjie Chen
(74) *Attorney, Agent, or Firm*—Patent Law Office of Larry Guernsey; Larry B. Guernsey

(57) ABSTRACT

A magnetic head is disclosed having a CPP read head which produces reduced cross-track interference. The CPP read head includes a read sensor, a first shield and a second shield. The second shield has side drapes having an edge portion adjacent to the read sensor. The side drapes include a plurality of laminated layers which discourages formation of closure domains at the edge portions, and thus maintaining the side drapes in a state of high magnetic permeability. The laminated layers each include a magnetic layer and a non-magnetic spacer layer. Also disclosed is an edge closed lamination structure.

20 Claims, 5 Drawing Sheets

LAMINATED DRAPED SHIELD FOR CPP READ SENSORS

BACKGROUND OF THE INVENTION

1. Field of the Invention

The present invention relates generally to magnetic heads for reading data written to storage media, and more particularly to magnetic read heads for disk drives.

2. Description of the Prior Art

As the areal density increases, and track widths become smaller and smaller, the difficulty of reading a particular track without interference or "cross-talk" from adjacent tracks increases. This occurs when the read sensor picks up magnetic flux from neighboring tracks, which then interferes with detection of data from the track currently being read. In an effort to decrease this interference, in-stack biased read heads which are configured with the current-perpendicular-to the plane (CPP) magnetic tunnel junction (MTJ) or giant magneto-resistive (GMR) sensors are often shielded with a side draped shield structure to minimize pick-up from adjacent tracks. These side drapes pick up the stray magnetic flux from neighboring tracks and route it away from the read sensor, so there is less interference. As shown in FIG. 5 (prior art), the read sensor 50 is generally sandwiched between a first shield S1 30 and a second shield S2 34. The side drapes 62 extend part of the S2 shield 34 downwards around the read sensor 50, and generally adjacent to the sensor 50, separated by a thin insulating dielectric spacer 69. The adjacent edge of this draped S2 structure 62 is typically configured with an abrupt edge 65. In practice this edge may have a finite slope and an edge that is not perfectly sharp. However, the magnetic domains 66, 68 in magnetic metal of this structure 62 are expected to be formed in parallel, but opposite orientations, as shown in FIG. 6 (prior art), which is a detail view of the side drapes, showing these magnetic domains. In such a structure, there is a natural tendency for the material to form a "closure domain" 64 at the sharp edge 65, by which a magnetic domain 64 spontaneously forms at right angles to the opposite but parallel domains 66, 68. This closure domain 64 thus acts to complete the magnetic circuit. However, this closure domain 64, where the magnetization direction is parallel to the field coming from the media, has lower magnetic permeability than domains where the magnetization is perpendicular to the field, and thus is less able to direct interfering magnetic flux from adjacent tracks away from the read sensor 50. It therefore provides less desirable magnetic shielding than a structure which does not include these closure domains.

Thus there is a need for a read head with draped shield structure in which the draped shield structure does not contain closure domains at the edge boundaries.

SUMMARY OF THE INVENTION

The present invention includes a magnetic head having a CPP read head which produces reduced cross-track interference during data reading operations. The CPP read head includes a read sensor, a first shield and a second shield. The second shield has side drapes having an edge portion adjacent to the read sensor. The side drapes include at least one laminated layer which discourages formation of closure domains at the edge portions, and thus maintains the side drapes in a state of high magnetic permeability. The laminated layer includes a magnetic layer and a non-magnetic spacer layer. Also disclosed is an edge closed lamination structure.

It is an advantage of the present invention that the draped shield structure minimizes read errors by screening out interference from adjacent tracks.

It is a further advantage of the present invention that closure domains are minimized in the draped shields so that sensitivity of the draped shields is enhanced and thus screening of interference is enhanced.

It is yet another advantage of the present invention that high magnetic permeability of the draped shield is maintained right up to the edge of the shield, which is the portion closest to the read sensor, and thus most crucial to its operation.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
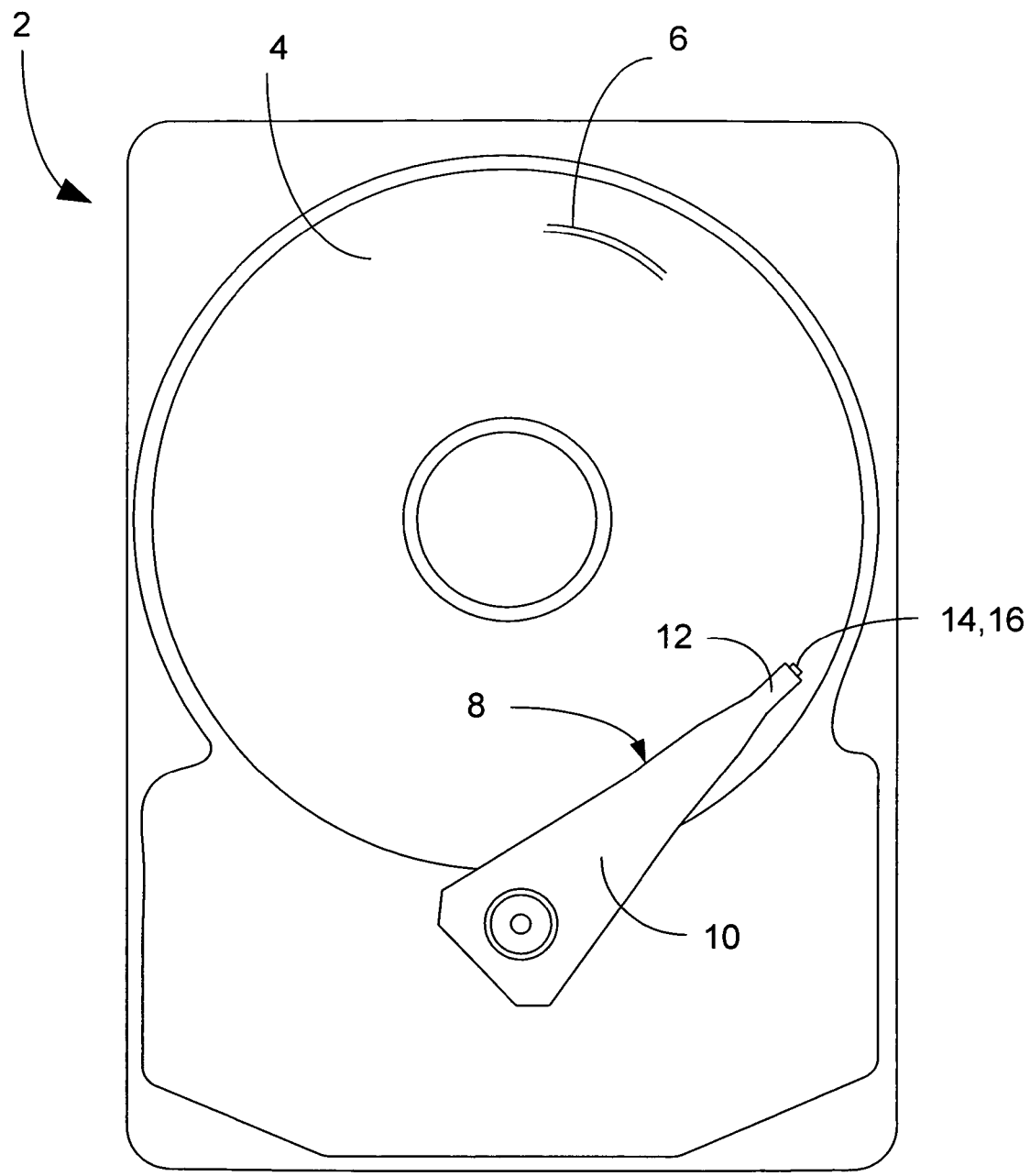
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
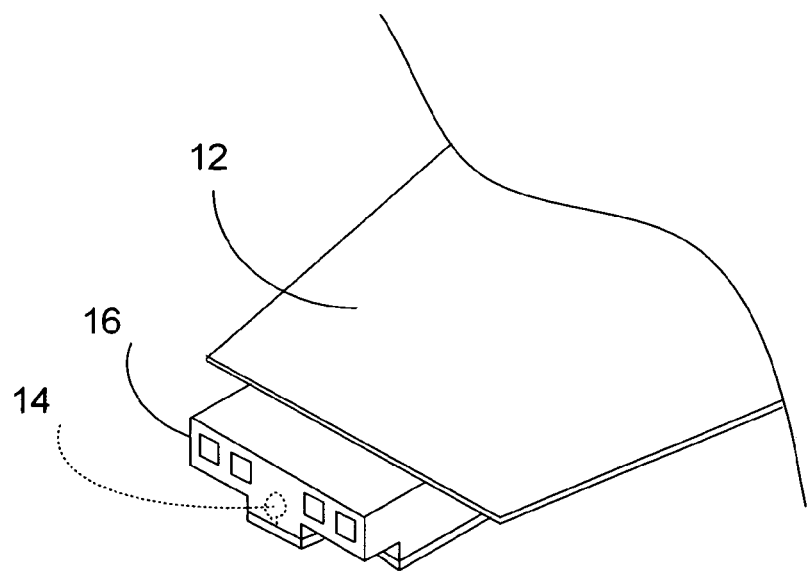
FIG. 2 illustrates a perspective view of view of an exemplary slider and suspension.
Figure 3:
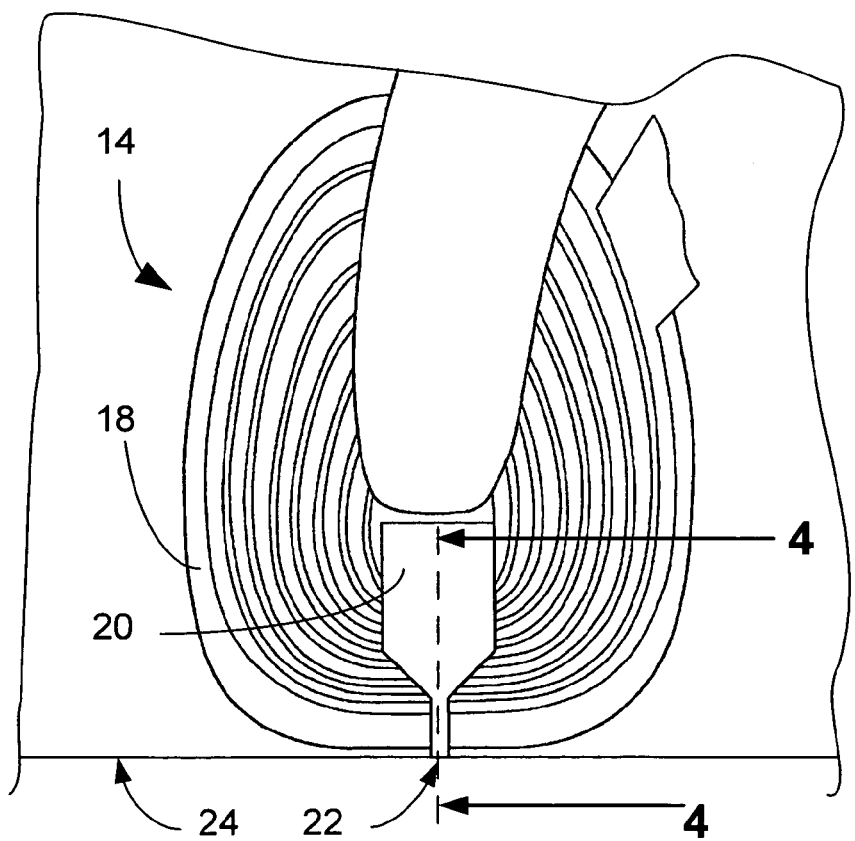
FIG. 3 shows a top plan view of an exemplary read/write head.
Figure 4:
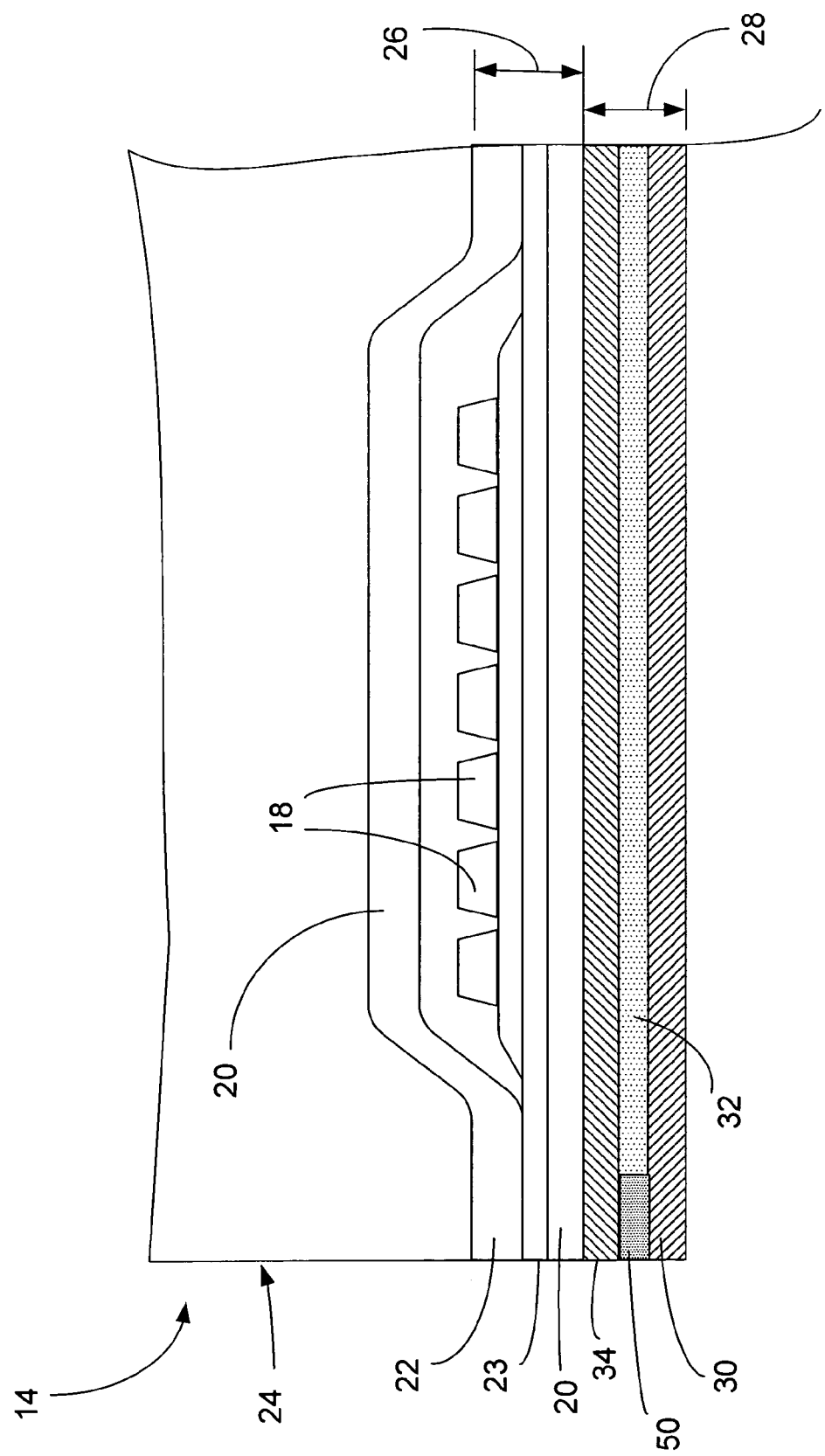
FIG. 4 is a cross-section view of an exemplary read/write head.

FIG. 2 shows a slider 16 in more detail being supported by suspension 12. The magnetic head 14 is shown in dashed lines, and in more detail in FIGS. 3 and 4. The slider shown in FIG. 4 is of a configuration known as Current Perpendicular to Plane (CPP), meaning that current flows vertically in the pictured figure rather than horizontally. The magnetic head 14 includes a coil 18, P1 pole 20, and a second pole P2 22 which is separated from P1 pole 20 by write gap 23. The P1 pole 20, second pole P2 22 and write gap 23 can be considered together to be included in the write head 26.

A read sensor 50 is sandwiched between a first shield, designated as S1 30 and a second shield S2 34, and these elements together make up the read head 28. In this configuration of read head 28 where Current is Perpendicular to the Plane (CPP), shields S1 30 and S2 34 act as electrical leads supplying current to the read sensor 50 which lies between them. An insulation layer 32 also separates the S1 30 and S2 34 electrical leads in the area behind the read sensor 50, so that they do not short out along their length. The magnetic head 14 flies on an air cushion between the surface of the disk 4 and the air bearing surface (ABS) 24 of the slider 16

Figure 5:
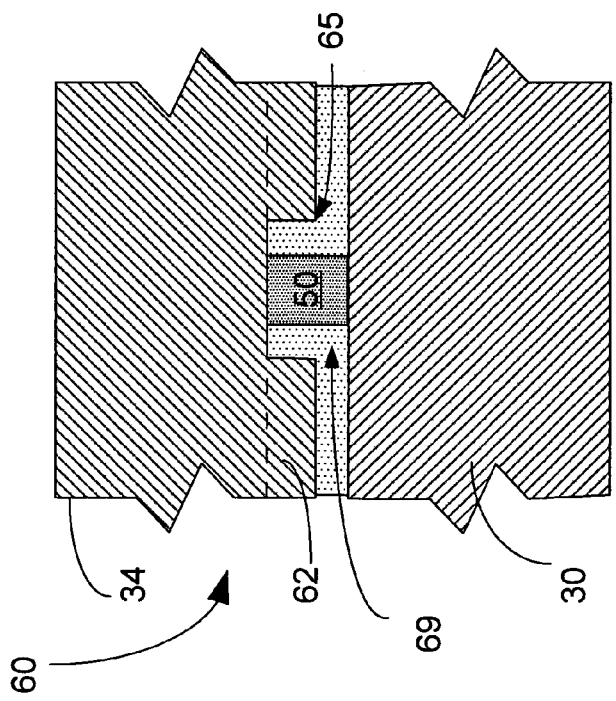
FIG. 5 is a front plan view of the structure of a CPP read head of the prior art as seen from the ABS.
Figure 6:
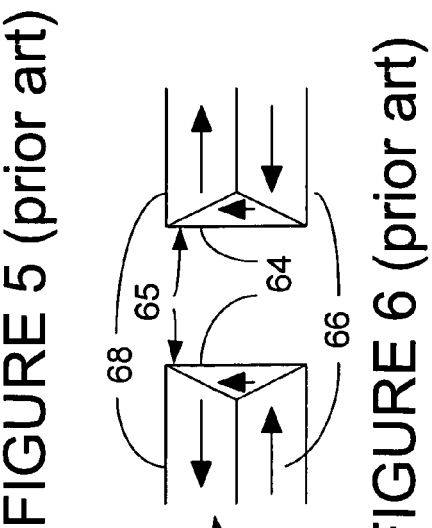
FIG. 6 is a detail top view of the structure of the magnetic domains of the side drapes of the shield of the prior art.

As the areal density of storage media steadily increases and track widths become narrower and closer together, there is more and more chance of a read head picking up interference from adjacent tracks in the form of magnetic flux. This interference naturally increases read errors and is therefore undesirable. In an effort to decrease interference from adjacent tracks, a "draped shield" structure has been developed. FIG. 5 (prior art) shows a view from the ABS of one such draped shield structure 60, which includes a first shield S1 30 below the sensor 50, much the same as that shown from a side view in FIG. 4. The second shield S2 34 has protruding side drapes 62 of highly magnetically permeable material which are intended to shield the sensor 50 from magnetic flux from adjacent tracks. This configuration decreases cross-track interference to some degree, but its functioning is hampered by the formation of closure domains 64, as shown in FIG. 6 (prior art). Such domains can form in the ABS plane and/or in the plane perpendicular to the ABS. FIG. 6 shows a detail top view of the domain structure near the edges 65 of the side drapes 62 of the prior art. The material of the side drapes forms into domains 66, 68 of opposing orientation. It is also an unfortunate natural tendency of the material to form closure domains 64, linking the ends of the opposing domains 66, 68 to complete a magnetic circuit. This reduces the magnetic permeability of the edges of the side drapes 62, and thus reduces the effectiveness of the draped shield in eliminating cross-track interference.

In fabrication of these draped shield structures of the prior art, to provide shielding of instack biased CPP MTJ/GMR sensors 50, the sensor 50 is patterned, and an insulating layer 69 is deposited followed by the side shields 62. The thickness of this side shield 62 is approximately the thickness of the sensor 50 minus the deposited thickness of the insulating layer 69. Thus for an instack biased sensor 50, this side shield layer 62 thickness is preferably in the order of 300~500 Å. Typically this is deposited as a single layer consisting of a soft magnetic alloy (e.g. NiFe). This results in the draped shield 60 having an abrupt edge 65 to it (adjacent to the CPP sensor 50). This edge 65 includes an edge closure domain 64, which has low permeability when excited by a magnetic field perpendicular to the ABS direction. Since this edge 65 is closest to the sensor 50, this edge 65 is most critical in providing flux shielding. Therefore it is desirable to prevent the formation of this closure domain 64 and leave this edge 65 in a high permeability state.

Figure 7:
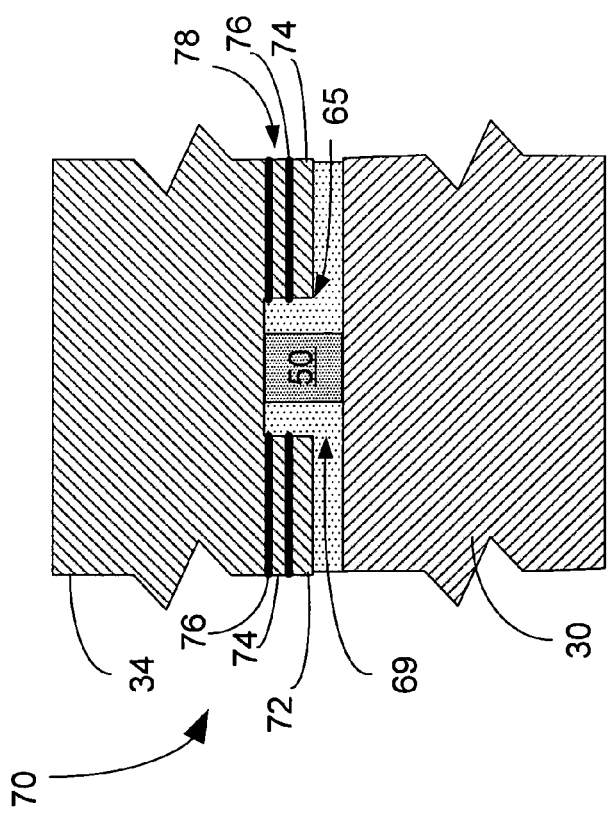
FIG. 7 is a front plan view of the structure of a CPP read head of the present invention as seen from the ABS.
Figure 8:
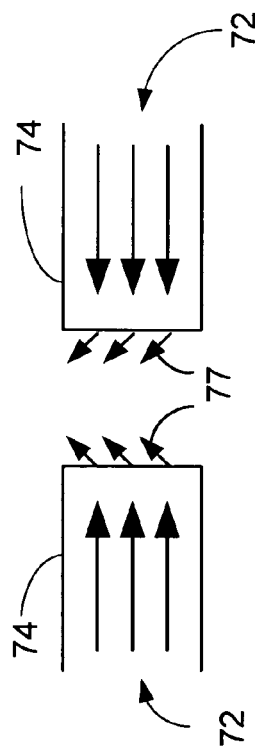
FIG. 8 is a detail top view of the structure of the magnetic domains of the side drapes of the shield of the present invention.
Figure 9:
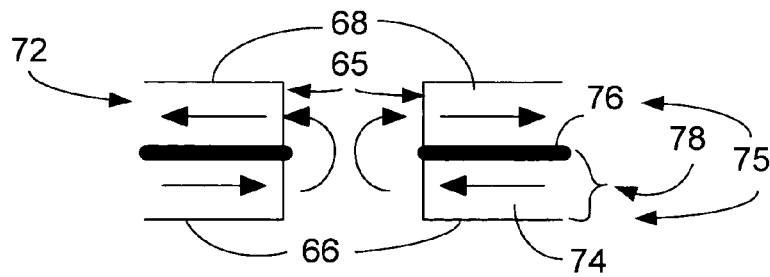
FIG. 9 is a detail side view (ABS view) of the structure of the side drapes of the shield of the present invention.

As depicted in FIGS. 7-9, the present invention presents an improved draped shield structure 70 with laminated side drapes 72. These side drapes 72 are divided into multiple thin magnetic layers 74 separated by a non-magnetic spacer material 76. For purposes of this disclosure, a magnetic layer 74 and a non-magnetic layer 76 together will be referred to as a laminated layer 78. This laminated structure 70 results in a more desirable domain structure at the edge 65 of the draped shield 72 (adjacent to the sensor 50) with flux closing between adjacent laminated layers 78, as shown by the arrows, but without the formation of closure domains.

FIG. 8 shows a detail top view of the domain structure in laminated side drapes 72. In comparison to the prior art in FIG. 6, FIG. 8 shows that the magnetic domains within each magnetic layer 74 are largely uniformly aligned, as indicated by the arrows. The presence of a two magnetic layers of a magnetic layer pair 75 in close proximity (see FIG. 9), separated by only a very thin non-magnetic layer 76, induces the magnetic layers 74 to form magnetic layer pairs 75, which complete magnetic circuits by production of magnetic flux lines curving outside the laminated layers 78 from one of the layer pairs to the other. The angled arrows in FIG. 8 are intended to indicate the flux lines 77 looping out of the plane of the paper to a layer positioned vertically below. Thus, closure domains 64 (see FIG. 6) as in the prior art, are not formed. Without closure domains 64, the result is a high permeability magnetic shield right up to the edge 65 of the draped shield 70.

The layers of magnetic material 74 are necessarily very thin, preferably in the range of 50-500 Å (50-500×10$^{-10}$ m), and are preferably made from materials such as NiFe, CoFe, Co, FeN, FeSiN, FeAlN. The thickness of the non-magnetic layers 76 is preferably even thinner, preferably in the range of 10-100 Å (10-100×10$^{-10}$ m), and are preferably made from materials such as $Al_2O_3$, $Si_3N_4$, $SiO_2$, NiFeCr. It is to be understood that these materials and dimensions are not to be construed as limitations, and many other variations will be obvious to those skilled in the art.

Although the discussion so far has used the example of two laminated layer, having two magnetic layers which form a one magnetic layer pair, this is not to be construed as a limitation. Multiple laminated layers are contemplated by the invention. While it is preferred that the magnetic layers be of an even number to facilitate their formation into magnetic layer pairs, this also is not to be construed as a limitation, and there may be odd-numbers of laminated layers included.

Figure 10:
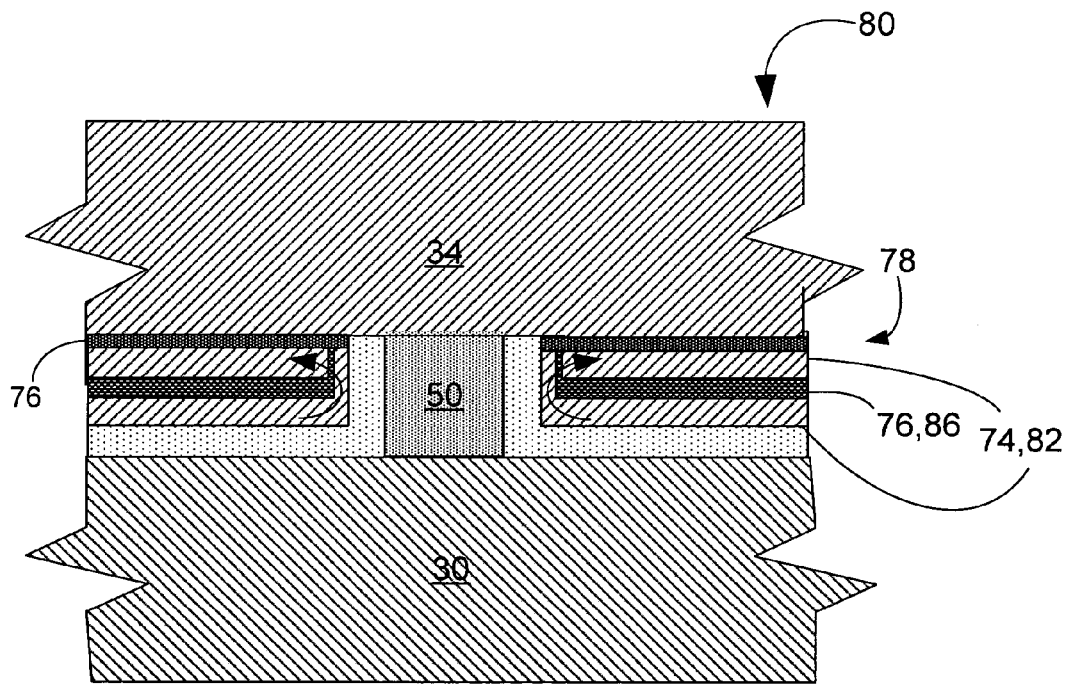
FIG. 10 is a front plan view of the structure of an alternate embodiment CPP read head of the present invention having edge closed lamination as seen from the ABS.
Figure 11:
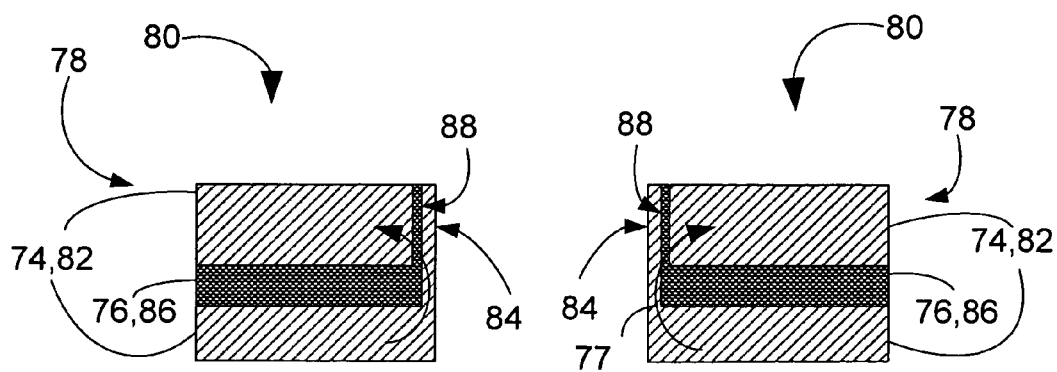
FIG. 11 is a detailed view of the structure of the magnetic domains of the side drapes of the shield of the embodiment of the present invention having edge closed lamination.

In practice, it may be difficult to make the magnetic layers and the non-magnetic layers in the side drapes perfectly flat. This is because these layers are being deposited adjacent to the sidewalls of the sensor, with possibly a photoresist or other mask on top of the sensor, which would likely cast a shadow on the deposition process. The material would also coat the sidewall of the sensor, but would be thinner than on the flat surface resulting in the structure of an alternative embodiment, which will be referred to as an edge closed lamination structure 80, as shown in FIGS. 10 and 11. As before, the sensor 50 is shown sandwiched between the first shield S1 30 and the second shield S2 34. There are laminated layers 78 which include magnetic layers 74 and non-magnetic layers 76. However the edge closed lamination structure 80 includes edge closed magnetic layers 82 including at least one magnetic layer with an angled edge closed portion 84, and also at least one edge closed non-magnetic layer 86 including at least one with an angled edge closed portion 88. The angled edge closed portion 84 of the edge closed magnetic layer 82 is very thin, and the angled edge closed portion 88 of the edge closed non-magnetic layer 86 even thinner. The angled edge closed portion 88 of the edge closed non-magnetic layer 86 is so very thin as it forms adjacent to the sidewall of the sensor, that it does not prevent the flow of magnetic flux 77 between the edge closed magnetic layers 82, 84, and the edge closed magnetic layers 82, 84 are magnetically shorted together. In this alternative embodiment the flux closes through the shorted edge closed magnetic layers 82, 84, instead of through air as in the previous embodiment 78, shown in FIG. 8. In both embodiments the undesirable closure domain of the prior art is eliminated.

It is also preferred that a flat non-magnetic layer 76 is included between the main bulk of the S2 shield 34 and the rest of the edge closed lamination structure 80, as shown in FIG. 10.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic head including a CPP read head, comprising:
   a read sensor;
   a first shield; and
   a second shield having side drapes, where said side drapes include a plurality of laminated layers wherein each of said plurality of laminated layers comprises a magnetic layer and a non-magnetic spacer layer, and wherein said non-magnetic spacer layer is made from material chosen from a group consisting of $Al_2O_3$, $Si_3N_4$, $SiO_2$, and NiFeCr.

2. The magnetic head of claim 1, wherein:
   said magnetic layer has a thickness lying in the range of 50-500 A.

3. The magnetic head of claim 1, wherein:
   said non-magnetic spacer layer has a thickness lying in the range of 10-100 A.

4. The magnetic head of claim 1, wherein:
   said magnetic layer is made from material chosen from a group consisting of NiFe, CoFe, Co, FeN, FeSiN, and FeAlN.

5. The magnetic head of claim 1, wherein:
   two of said magnetic layers of said plurality of laminated layers form a magnetic layer pair.

6. The magnetic head of claim 5, wherein:
   said side drapes include multiple magnetic layer pairs.

7. The magnetic head of claim 1, wherein:
   said side drapes include multiple laminated layers.

8. The magnetic head of claim 1, wherein:
   said plurality of laminated layers of said side drapes are configured as an edge closed lamination structure.

9. The magnetic head of claim 8, wherein:
   said edge closed lamination structure includes at least one edge closed magnetic layer having an angled edge closed portion, and at least one edge closed non-magnetic layer having an angled edge closed portion.

10. A disk drive comprising:
    at least one hard disk;
    at least one magnetic head adapted to fly over said hard disk for reading data from said hard disk, said magnetic head including a CPP read head, including:
    a read sensor;
    a first shield; and
    a second shield having side drapes, where said side drapes include a plurality of laminated layers wherein each of said plurality of laminated layers comprises a magnetic layer and a non-magnetic spacer layer, and wherein said non-magnetic spacer layer is made from material chosen from a group consisting of $Al_2O_3$, $Si_3N_4$, $SiO_2$, and NiFeCr.

11. The disk drive of claim 10, wherein:
    said magnetic layer has a thickness lying in the range of 50-500 A.

12. The disk drive of claim 10, wherein:
    said non-magnetic spacer layer has a thickness lying in the range of 10-100 A.

13. The disk drive of claim 10, wherein:
    said magnetic layer is made from material chosen from a group consisting of NiFe, CoFe, Co, FeN, FeSiN, and FeAlN.

14. The disk drive of claim 10, wherein:
    said side drapes include multiple laminated layers.

15. The disk drive of claim 10, wherein: two of said magnetic layers of said plurality of laminated layers form a magnetic layer pair.

16. The disk drive of claim 10, wherein:
    said side drapes include multiple magnetic layer pairs.

17. The disk drive of claim 10, wherein:
    said plurality of laminated layers of said side drapes are configured as an edge closed lamination structure.

18. The disk drive of claim 17, wherein:
    said edge closed lamination structure includes at least one edge closed magnetic layer having an angled edge closed portion, and at least one edge closed non-magnetic layer having an angled edge closed portion.

19. The disk drive of claim 10, wherein:
    each of said plurality of laminated layers comprises a magnetic layer and a non-magnetic spacer layer, where said magnetic layer has a thickness lying in the range of 50-500 A, said non-magnetic spacer layer has a thickness lying in the range of 10-100 A, said magnetic layer is made from material chosen from a group consisting of NiFe, CoFe, Co, FeN, FeSiN, and FeAlN.

20. A magnetic head including a CPP read head, comprising:
    a read sensor;
    a first shield; and
    a second shield having side drapes, where said side drapes include a plurality of laminated layers wherein each of said plurality of laminated layers comprises a magnetic layer and a non-magnetic spacer layer and said plurality of laminated layers of said side drapes are configured as edge closed lamination structures which include at least one edge closed magnetic layer having an angled edge closed portion, and at least one edge closed non-magnetic layer having an angled edge closed portion.

* * * * *